(12) United States Patent
Cox et al.

(10) Patent No.: US 6,942,788 B1
(45) Date of Patent: Sep. 13, 2005

(54) GROWTH MEDIA WASTEWATER TREATMENT REACTOR

(75) Inventors: Raleigh Lee Cox, Baton Rouge, LA (US); Christopher Edward Cox, Denham Springs, LA (US); Brenda Guy, Baton Rouge, LA (US); Michael David Catanzaro, Baton Rouge, LA (US); Murphy Martin Arcemont, III, Gonzales, LA (US); Travis Lee LeJeune, Baton Rouge, LA (US)

(73) Assignee: Pentair Pump Group, Inc., Golden Valley, MN (US)

( * ) Notice: Subject to any disclaimer, the term of this patent is extended or adjusted under 35 U.S.C. 154(b) by 0 days.

(21) Appl. No.: 10/447,464

(22) Filed: May 29, 2003

(51) Int. Cl.$^7$ ................................................ C02F 3/06
(52) U.S. Cl. ..................... 210/151; 210/195.1; 210/256
(58) Field of Search ................................ 210/150, 151, 210/195.1, 196, 256

(56) References Cited

U.S. PATENT DOCUMENTS

| | | | | |
|---|---|---|---|---|
| 3,966,608 A | * | 6/1976 | Mason et al. ............... 210/151 |
| 4,137,171 A | * | 1/1979 | Yokata ........................ 210/150 |
| 4,680,111 A | * | 7/1987 | Ueda ........................... 210/150 |
| 4,859,321 A | * | 8/1989 | Iida ............................. 210/150 |
| 5,030,353 A | | 7/1991 | Stuth .......................... 210/605 |
| 5,122,266 A | * | 6/1992 | Kent ........................... 210/150 |
| 5,156,742 A | | 10/1992 | Struewing ................... 210/605 |
| 5,160,620 A | * | 11/1992 | Lygren ..................... 210/195.1 |
| 5,200,081 A | | 4/1993 | Stuth .......................... 210/615 |
| 5,217,788 A | | 6/1993 | Rye ............................ 428/184 |
| 5,308,479 A | | 5/1994 | Iwai et al. ................... 210/151 |
| 5,384,178 A | | 1/1995 | Rye ............................ 428/182 |
| 5,484,524 A | | 1/1996 | MacLaren et al. .......... 210/151 |
| 5,500,112 A | | 3/1996 | McDonald ................... 210/151 |
| 5,545,327 A | | 8/1996 | Volland ....................... 210/615 |
| 5,609,754 A | * | 3/1997 | Stuth .......................... 210/256 |
| 5,620,602 A | * | 4/1997 | Stuth .......................... 210/151 |
| 5,714,061 A | | 2/1998 | Guy et al. ................. 210/195.3 |
| 5,911,877 A | | 6/1999 | Perez et al. ................. 210/150 |
| 6,093,316 A | | 7/2000 | Cormier .................. 210/195.4 |
| 6,105,593 A | | 8/2000 | MacLaren et al. .......... 134/167 |
| 6,153,099 A | | 11/2000 | Weis ........................... 210/615 |
| 6,554,996 B1 | * | 4/2003 | Rebori ........................ 210/151 |

OTHER PUBLICATIONS

Brentwood Industries Brochure for "Accu-Pac Cross Flow Media".
Brentwood Industries Brochure for "Accu-Pac Vertical Flow Media".

* cited by examiner

Primary Examiner—Christopher Upton
(74) Attorney, Agent, or Firm—Jones, Walker, Waechter, Poitevent, Carrere & Denegre, L.L.P.

(57) ABSTRACT

A reactor chamber for placement in a wastewater treatment system, where the reactor chamber has a chamber formed from a sidewall which forms an interior of the chamber. The sidewall has a top portion and a bottom portion and fixed channel growth media positioned in the interior of the chamber. The fixed channel growth media is positioned below the top of the sidewall, so that when positioned in a treatment system, most of the growth media is located below the water level in the treatment system. The top of the sidewall near the water level (when positioned in a treatment system) is substantially impermeable to wastewater. The reactor includes an air distribution manifold system having a series of air release sites positioned below the fixed channel growth media and adapted to release air which disperses upwardly through the fixed channel growth media.

20 Claims, 16 Drawing Sheets

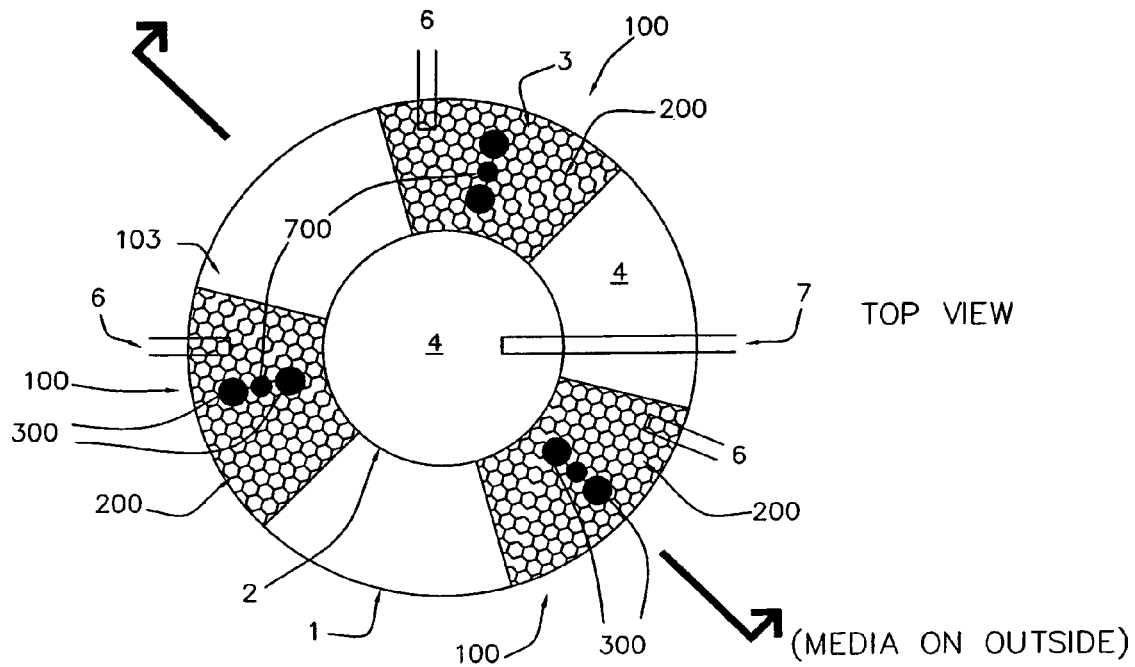
FIG 2A2
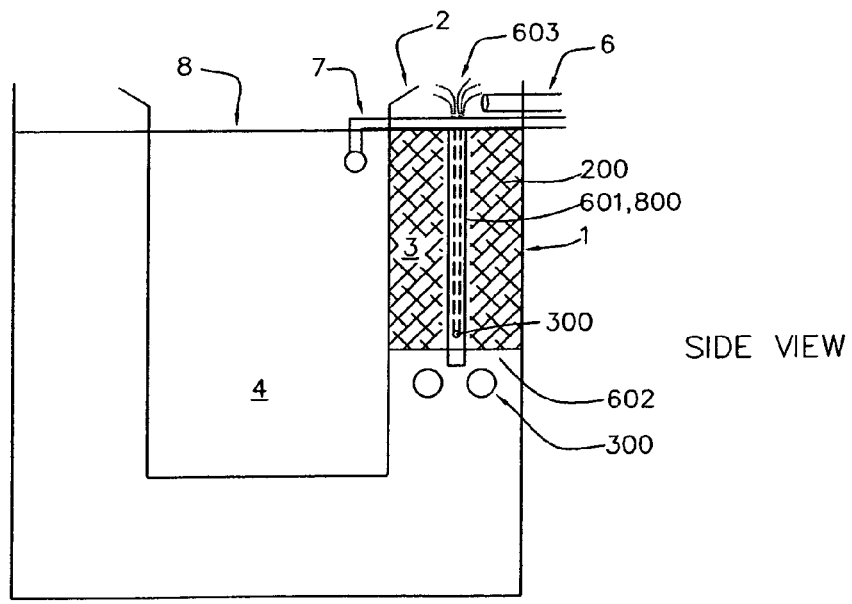
FIG 2A1

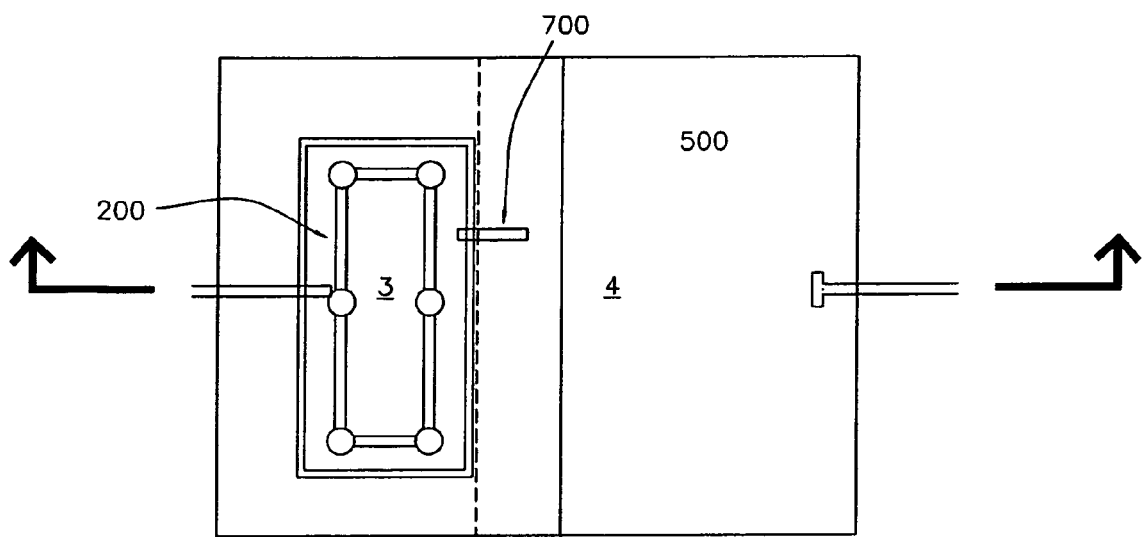
FIG 2B2
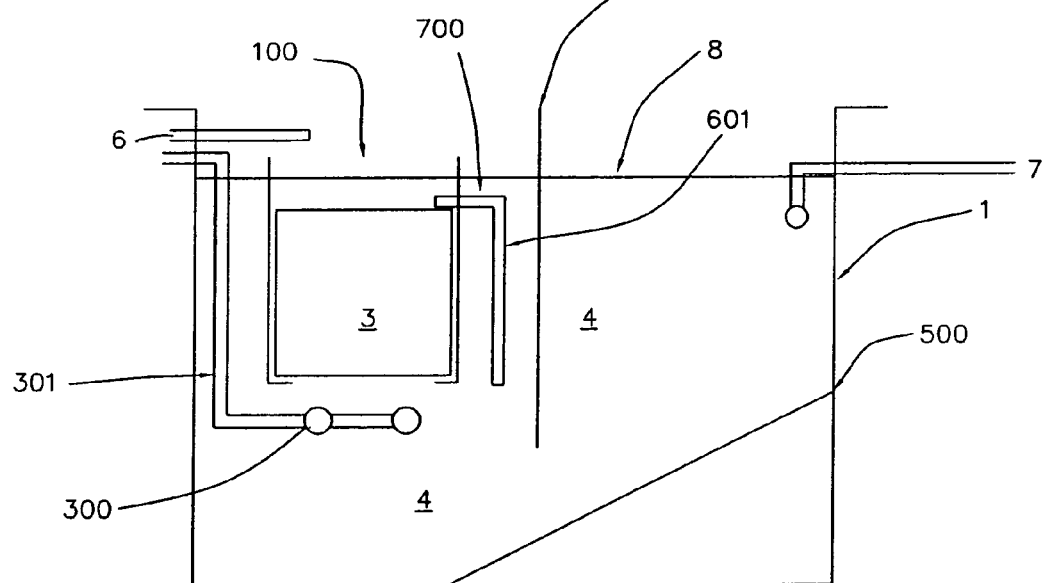
FIG 2B1
ELEVATION

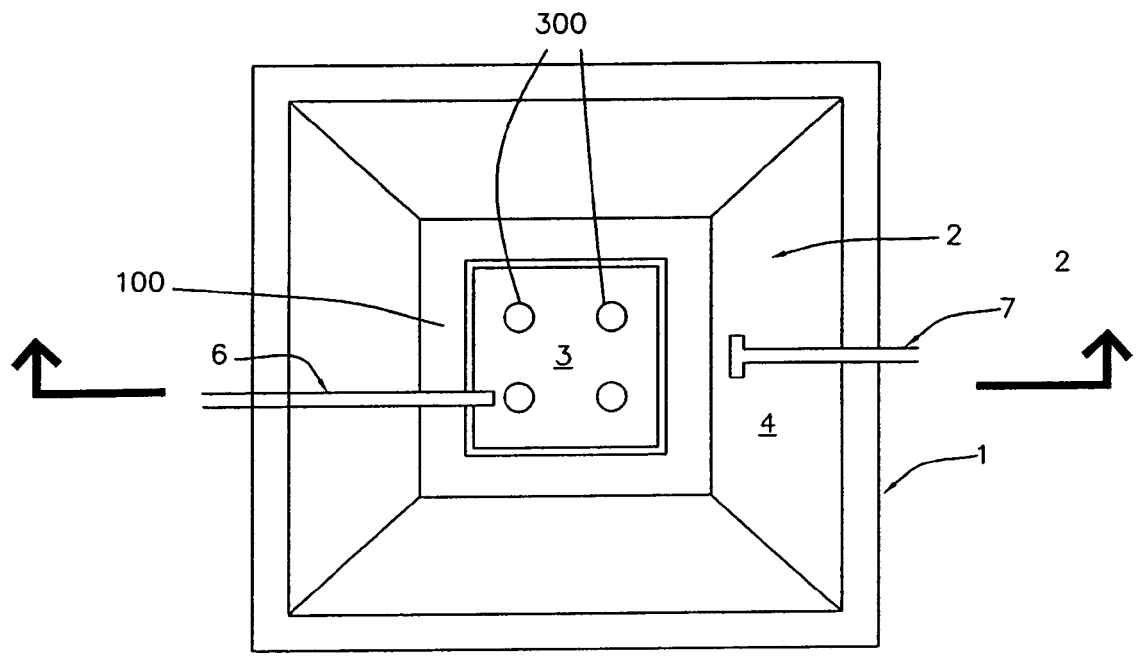
FIG 2C2
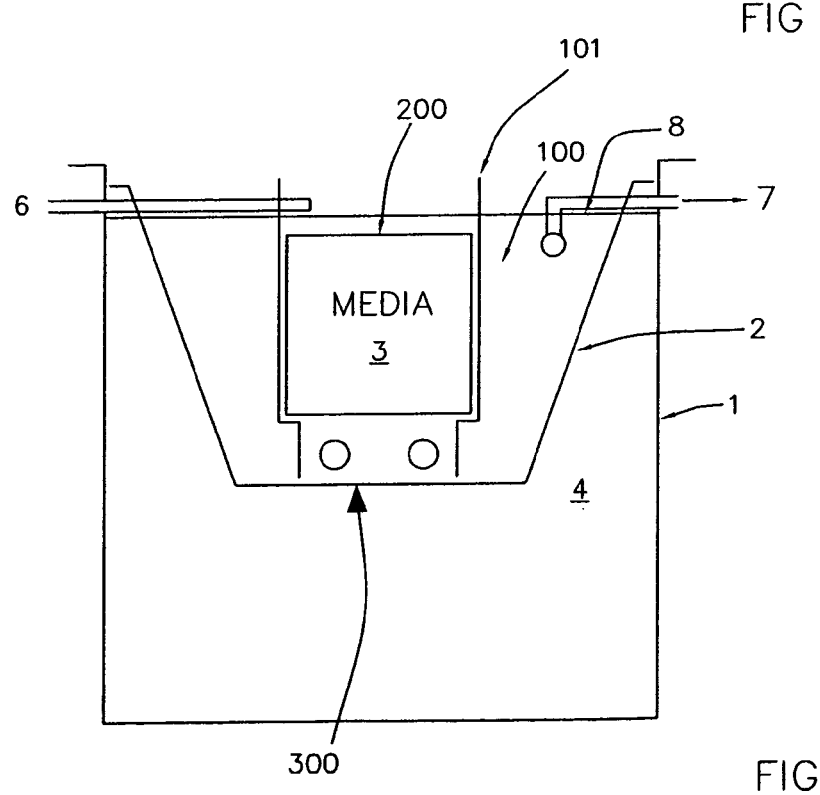
FIG 2C1

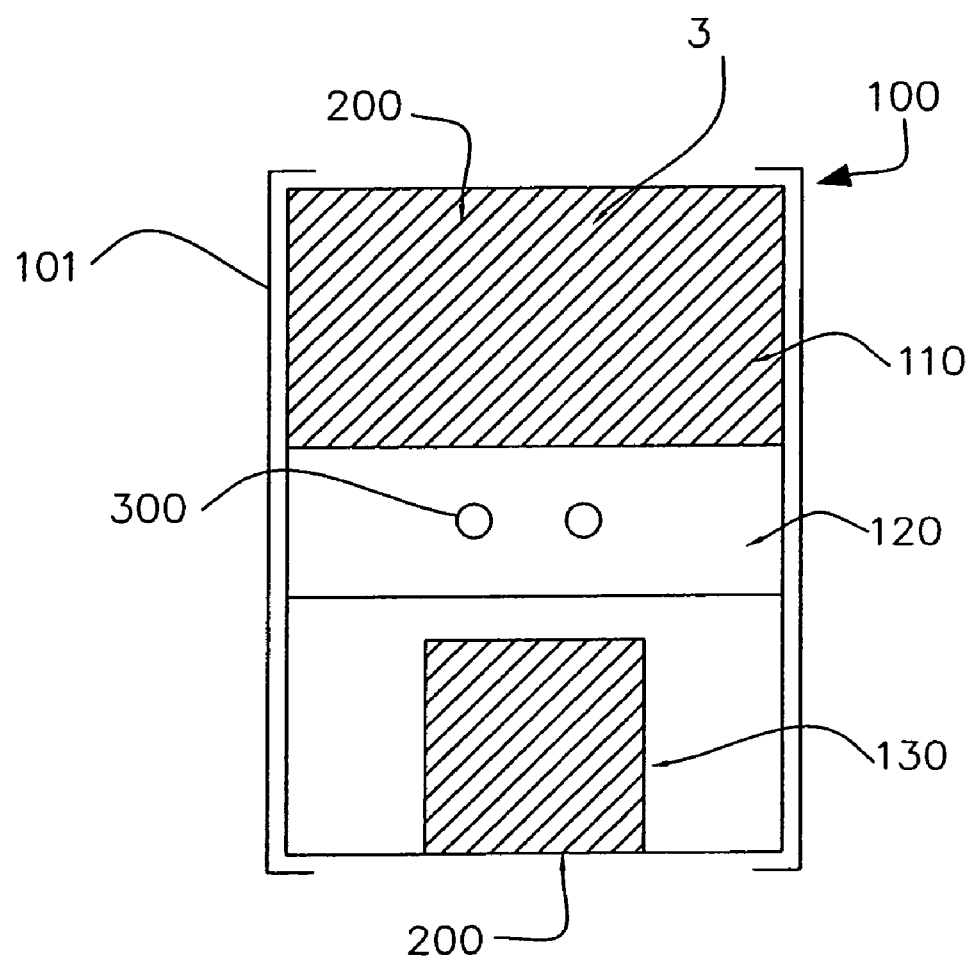
ELEVATION  FIG 4

SIDE VIEW

END VIEW

60

GROWTH MEDIA WASTEWATER TREATMENT REACTOR

BACKGROUND OF THE INVENTION

1. Field of the Invention

The invention relates to wastewater processing reactors, and in particular, to aerated fixed channel growth media reactors.

2. The Prior Art

Aerated wastewater treatment systems designed for small applications (less than 50,000 gallon daily capacity) generally involve an aeration treatment chamber or zone for injecting air into the wastewater, and a clarifier chamber of zone, a quiescent zone in which particles are allowed to settle out of the system. An example of such a treatment chamber is shown in Hansel. As can be seen, the aeration treatment zone is generally an empty chamber having several air release sites, usually located at the bottom of the chamber. An aerated treatment system treats wastewater through aerobic bacterial degradation of the waste materials present in wastewater or sewage. Aerobic bacterial metabolic degradation requires dissolved oxygen and hence, the release of air into the treatment chamber. Anoxic (oxygen free) degradation can also occur, and such is particularly efficient in removing undesired nitrates. In the Hansel system, waters in the aerobic treatment chamber are aerated, and in the process of aeration, mixing occurs, assisting in the transfer of oxygen into the wastewaters. Waters in the treatment chamber will eventually migrate to the clarifier zone. In the clarifier zone, no mixing occurs and the waters are calm, providing conditions to allow suspended solids to settle out of the clarifier zone to be returned to the treatment zone for further processing.

In the Hansel device, mixing and aeration occurs in a media free zone. The bacteria/microbes float freely in the treatment zone, having no surfaces (other than the container/clarifier sidewalls) on which to attach. While such free floating bacteria are effective in treating wastewaters, it is believed that more efficient treatment can be accomplished by providing a surface for bacterial and microbe attachment as in trickling type filtration systems, and directing the waters through the treatment media for treatment. Systems utilizing submerged growth media include that of U.S. Pat. No. 6,153,099 to Weis, et al; U.S. Pat. No. 5,156,742 to Struewing; U.S. Pat. No. 5,030,353 to Stuth; U.S. Pat. No. 5,200,081 to Stuth; U.S. Pat. No. 5,545,327 to Volland; and U.S. Pat. No. 5,308,479 to Iwai, et al, all incorporated by reference. In these systems, growth media is provided in the treatment or reactor chamber (such as the floating media balls in Stuth or the corrugated panels of Volland, and the cross flow media or vertical flow media manufactured by Brentwood Industries of Reading, Pa., also shown in U.S. Pat. No. 5,384,178 and U.S. Pat. No. 5,217,788, all incorporated by reference). Air lift or air release channels or draft tubes (airlift pumps) are provided through the media, such as in Struewing (reference 26), Iwai (reference 3P), Weis (reference 28), Stuth '754 (reference 12), and Stuth '081 (reference 8). Air may also be released on an external side of the media, such as shown in Volland. However, in these devices, oxygen is not directly transferred to the growing biomass on the growth media, but only indirectly and inefficiently through oxygen absorbed in wastewaters (dissolved oxygen) transferred during the air lift operation.

Another device addressing clogging of media fixed film base treatment is the device shown in U.S. Pat. No. 5,484,524 to MacLaren, et al (incorporated by reference). This device shows media disposed in a tank with a central media free core. An aspirator or air release site is positioned in the media free core, which induces a current in the tank, upward through the core, and then substantially downward through the media (See FIGS. 8 and 9). This device does not provide oxygen directly through the media, and hence, still suffers from clogging (See U.S. Pat. No. 6,105,593 to MacLaren, et al, describing a cleaning probe for the '524 device) and is not as efficient in providing oxygen directly to the growing biomass.

A device utilizing air dispersed through the fixed media is shown in U.S. Pat. No. 5,500,112 to McDonald. McDonald shows a series of chambers filled with media. Air is released under essentially the entire media bottom through a membrane covered panel at the tank bottom and consequently, there is no established circulation path through the media volume—upward flowing waters and downward following waters are intermixed throughout the media volume. Additionally, the McDonald device is a series of tanks substantially filled with media: the McDonald device lacks a media free treatment volume (a buffer zone or dilution zone). This lack results in the need for an excessive amount of media to effect treatment, making the McDonald device inefficient and uneconomic. Additionally, the lack of a dilution or buffer zone in each reactor chamber makes treatment inefficient. With no dilution zone, McDonald places the aeration panels on the floor of each reactor. The reactor floor is where sludge (fully digested waste materials) normally would be deposited by precipitation. The McDonald device forces sludge in all three reactor chambers to remain in suspension until the sludge can be directed to a quiescent zone, the remote McDonald 4th chamber. However, access from one reactor to the next and eventually to the 4th zone, is through the fluid channels at the very top of the reactor, also tending to keep sludge, which would normally participate, in suspension in each reactor chamber. Consequently, McDonald each reactor chamber will have higher sludge concentration levels than in systems having a dilution zone. With higher concentration of solution sludge, treatment is more inefficient as the ration of usable (digestible) waste materials to total waste materials is suppressed.

In aerated growth media reactors, current flow in the system is induced by air injection. The induced current within the media is generally an upward flow through the air lift tubes (or in the case of Volland, on the side of the growth media) and downward through the fixed media. In aerated growth media treatment systems, waters remote from the treatment media must also be transported to the media surfaces for treatment, as treatment is substantially localized in the growth media. Hence, efficient mixing throughout the entire chamber is highly desirable. The use of air lift tubes generally induces a current in the treatment center sufficient to provide the needed full system mixing, that is, to bring waters remote from the growth media to the growth media for contact and treatment by bacterial colonies attached to the growth media.

Use of air lift tubes thus induces a current and provides indirect oxygen to the biomass. Air lift tubes also present scouring of the growth surfaces caused by rising bubbles interacting against the growth surfaces. As the introduced air is not passing upwardly through the growth media, upward turbulence through the growth media is reduced. Reduced upward turbulence in the growth media increases the potential for bacterial growth to occlude the channels, thereby plugging or clogging the flow channels in the media. One attempt to minimize plugging is shown by Volland. Volland uses corrugated panels placed back to back creating channels orientated at 60 degrees from the vertical. Volland thus tries to direct the bacterial slough-off down the channels to the bottom of the media.

Growth media treatment systems as shown additionally introduce wastewaters into the growth media by pumping incoming wastewaters into a portion of the system remote from the media, and allowing the induced current to transport the new influx of treatable materials to the treatment media. This process, however, dilutes the raw incoming sewage or wastewater and extends the time for materials present in the incoming waters to be transported to the treatment media.

Finally, all small plant treatment systems in the United States must pass stringent regulatory requirements for effluent quality and plant performance. Two of the plant performance characteristics that fixed growth media treatment plants have difficulty achieving are start-up time and vacation time. These are time requirements during which a plant must meet effluent standards: start-up time refers to the time a newly installed plant must meet effluent standards after initial start-up; vacation time refers to the time a plant must meet effluent standards after re-starting from a dormant period (a vacation). The regulatory requirement for start-up/vacation times are difficult to achieve for growth media surfaces as the biomass on the growth surfaces must either be established (for start-up) or replenished after a period of starvation (during the dormant period). The biomass response time to condition changes, when localized as on a growth media, is generally slower then in the extended aeration system, such as the Hansel system. Consequently, a growth media treatment system will take longer to start-up than an extended air treatment system.

OBJECTS OF THE INVENTION

It is an object of the invention to provide an aerated wastewater treatment system with growth media where air flow is directed to disperse upwardly through the media.

It is an object of the invention to provide an aerated wastewater treatment system with growth media with both upward and downward flow through the growth media.

It is an object of the invention to provide an aerated wastewater treatment system with growth media of at least two differing flow paths.

It is an object of the invention to provide an aerated wastewater treatment system with growth media and an integrated clarifier.

It is an object of the invention to provide an aerated wastewater system using growth media that provides for increased oxygen transfer while maintaining adequate circulation in the system.

SUMMARY OF THE INVENTION

The invention comprises a growth media reactor chamber designed for placement in a wastewater treatment system. The growth media reactor is a side-walled chamber having a growth media positioned therein, where the bacterial growth media creates fixed airway passages through the growth media. The outer walls of the chamber extends above the growth media. When positioned in a treatment system, the growth media is substantially at or below the water level in the treatment system. Generally positioned below the media is a series of air release sites, allowing air released from these sites to disperse upwardly through the media. When positioned in a treatment center, inlet waters are directly discharged into the top of the reactor chamber. The top portion of the walls of the reactor chamber should fluidly isolate the top interior portion of the reactor chamber from the top exterior portion of the reactor chamber. The reactor chamber creates a mixing/treating zone within the wastewater treatment system.

BRIEF DESCRIPTION OF THE DRAWINGS

FIG. 2A1 is a side cross-sectional view of another embodiment of the invention.

FIG. 2A2 is a top cross-sectional view of another embodiment of the invention.

FIG. 2B1 is a side cross-sectional view of another embodiment of the invention.

FIG. 2B2 is a top cross-sectional view of another embodiment of the invention.

FIG. 2C1 is a side cross-sectional view of another embodiment of the invention.

FIG. 2C2 is a top cross-sectional view of another embodiment of the invention.

FIG. 4 is a cross-section view through another embodiment of the reactor and air release locations, where the air release locations are positioned internally in the reactor.

DETAILED DESCRIPTION OF THE INVENTION

A. The Treatment System—Retrofit

Figure 1:
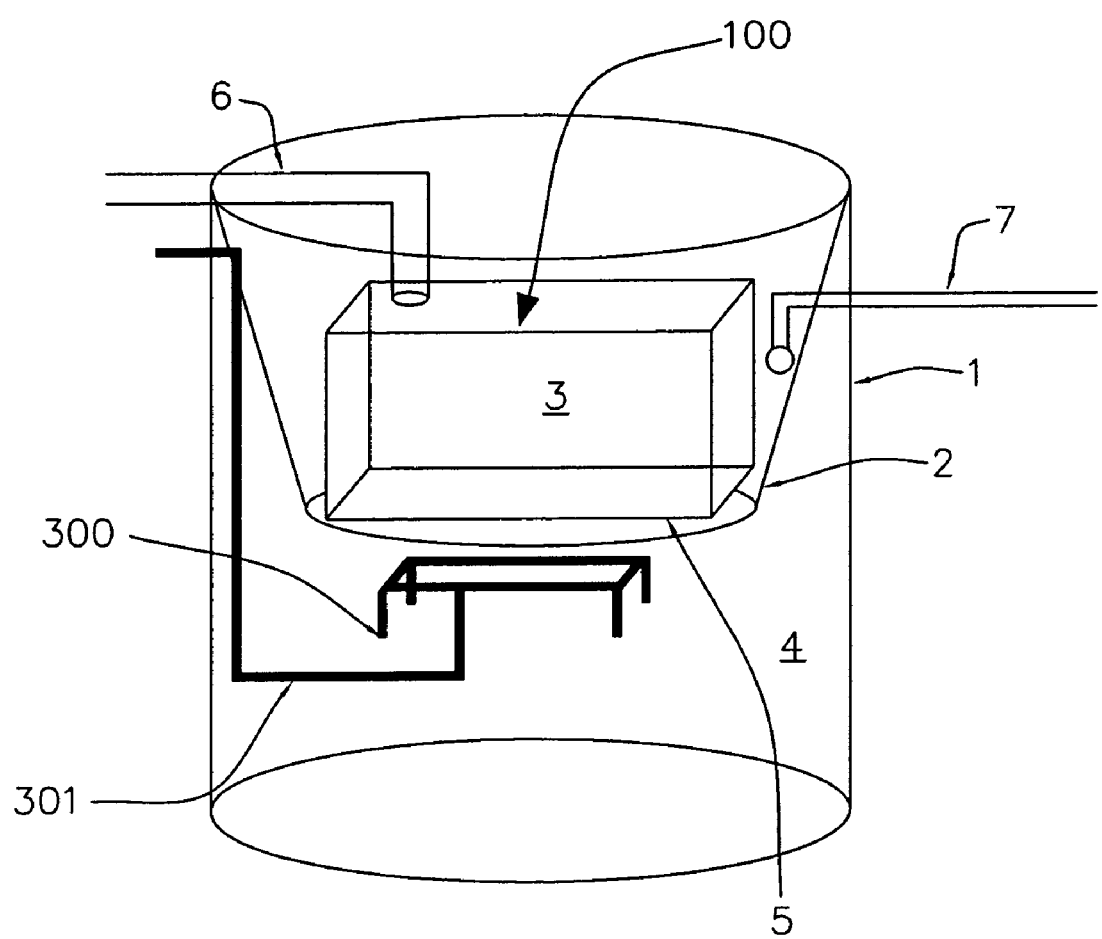
FIG. 1 is a prospective view of one embodiment of the present invention showing the major components of the treatment system.
Figure 2:
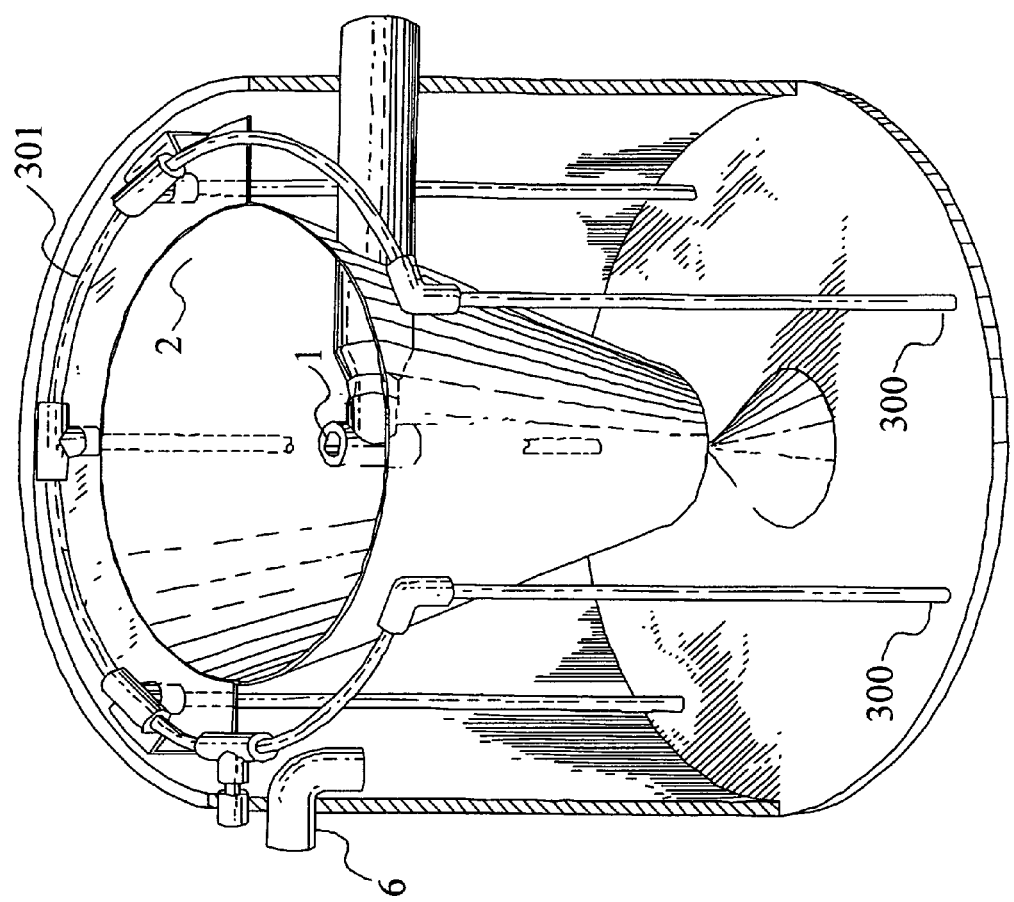
FIG. 2 is a prospective view of a prior art treatment system.

Shown in FIG. 2 is a prospective view of a prior art Hansel system, showing a tank 1, a sidewall 2 creating an internal volume considered the clarifier (also called the quiescent zone). The volume external to the clarifier area contains a series of discrete air release sites 300, connected by an air distribution manifold 301 to an air compressor. The volume external to the clarifier area is considered the mixing zone. Wastewaters are brought into the mixing zone through an inlet 6, and removed from the system through outlet 7 positioned in the clarifier. FIG. 1 shows a Hansel-type treatment system modified for incorporation in the present invention. Shown is tank 1, having a closed bottom and closable top, and is generally constructed of resin reinforced fiberglass. Positioned within the tank 1 is the clarifier sidewall 2. As shown, tank 1 is a cylinder with clarifier sidewall 2 forming a second cylinder (the clarifier) having an open bottom and open top positioned in the interior of the tank 1. Located in the interior of the clarifier is the growth media reactor 100, with growth media 200 positioned therein. Located below the reactor is a series of air release sites 300, connected through a distribution manifold 301. Inlet 6 brings incoming wastewater into the top of the reactor 100. The volume of the treatment system below the reactor 100 containing the air sites 300 is considered the air release volume. The tank's volume is thus partitioned or separated into four zones: (1) the interior of the reactor chamber (considered the mixing zone 3); (2) the air release volume, the volume of the tank where air injection takes place, preferentially located beneath and adjacent to the reactor; (3) the quiescent zone, the volume internal to the clarifier excluding the reactor volume; and (4) the remainder of the tank external to the clarifier, considered the dilution zone. This partition differs from that of the standard Hansel type system where the interior of the clarifier is considered the quiescent zone and the remainder of the tank is the mixing zone. The quiescent zone is in fluid communication with the dilution zone through the bottom open end of the clarifier sidewall (that is, the reactor chamber does not block fluid communication through the clarifier bottom opening). Note, the clarifier sidewall is generally impermeable to wastewaters.

Figure 1B:
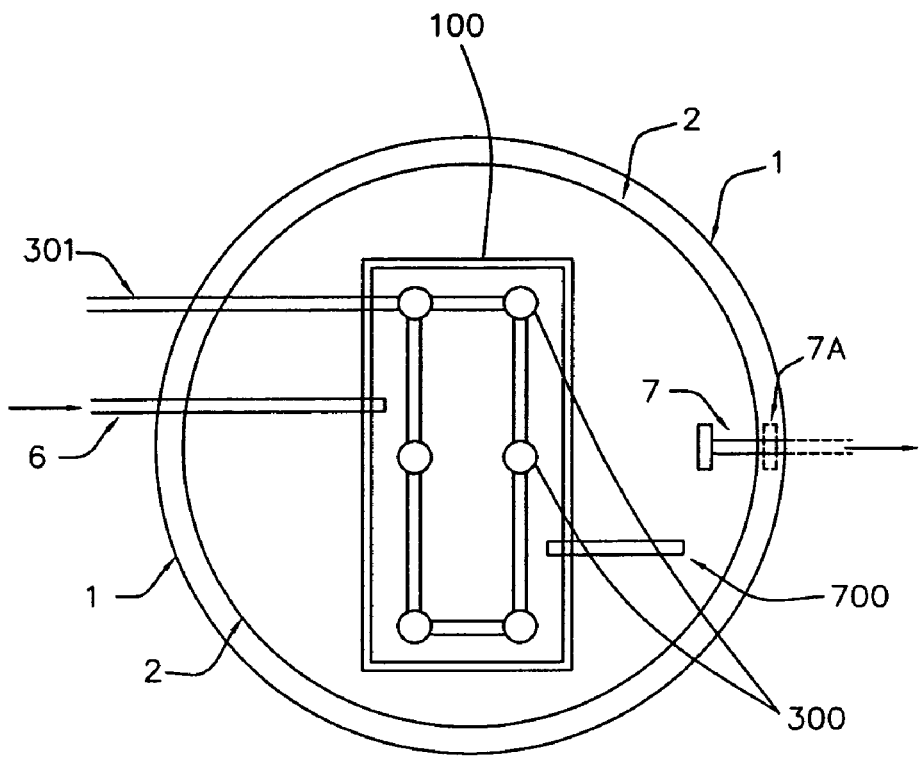
FIG. 1B is a top view of the embodiment shown in FIG. 1.
Figure 1A:
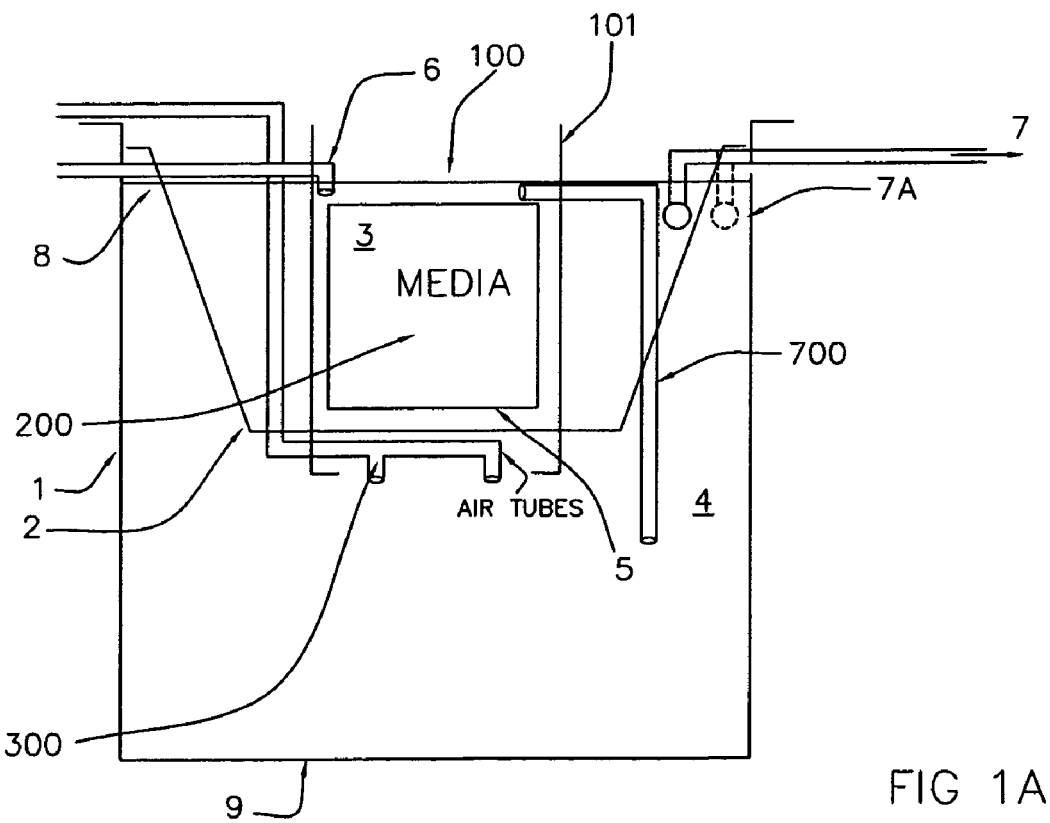
FIG. 1A is a vertical cross-sectional view through FIG. 1.

As shown in FIG. 1, outlet 7 removes water from the quiescent zone (here, the interior of the clarifier external of the mixing zone or reactor chamber; as shown by the dotted outline of outlet 7A in FIG. 1A, the outlet 7 may also be positioned in the dilution zone external to the clarifier). The mixing zone 3 is in fluid communication with the quiescent zone 4 through with the interior of the clarifier, and in fluid communication with dilution zone through the open bottom 5 of the reactor chamber and the open bottom of the clarifier. The outlet 7 removes treated waters from the system. Also shown is air manifold 301 connected to a source of air (a compressor, not shown), the air manifold terminates in a series of openings, the air release locations 300, located beneath the reactor chamber 100. When the air manifold is charged, air travels through the manifold to be discharged from the air release locations. A preferred structure for the air release location is shown in U.S. Pat. No. 5,714,061 to Guy, et al, incorporated herein by reference. In addition, the opening of the air release location may be terminated in an open "L" shaped pipe fitting. Upon system start-up, water in the air manifold may be discharged through the open ends of the air release locations. The L shaped fitting acts to re-direct downward flow of wastewater emanating from the air distribution manifold away from the bottom of the tank to minimize sediment disturbance. In most of the figures, the general location of the air release sites are indicated by an "O." The "O " is intended to show the general location, but not the structure, of an air release location.

FIG. 1A shows a cross-section through the treatment system in FIG. 1, while FIG. 1B shows a top view of the treatment center in FIG. 1. An additional feature shown in FIG. 1A is a recirculation means, here an air lift tube 700, later described.

The specific geometry of the tank arrangement utilizing a growth media reactor can vary. Shown in FIGS. 2A–2C are other arrangements of tank and clarifier sidewalls. In FIG. 2A, a top and side cutaway view a circular tank 1 is shown with the clarifier sidewall 2 forming a cylinder positioned in the tank 1. In this embodiment, the mixing zone 3 is three reactors 100 located in the dilution zone located between the clarifier sidewall 2 and the exterior wall of the tank. Outlet 7 is located in the quiescent zone internal to the clarifier. Each reactor 100 has an inlet 6 (connected through a wastewater distribution manifold, not shown) and an associated air release volume shown directly beneath each reactor chamber. Inlet 6 empties directly into the interior of each reactor chamber 100 and an outlet 7 draws water from the quiescent zone 4 for discharge from the treatment system. Each reactor has growth media 200 positioned in the reactor with discrete air release locations 300 positioned below the reactor 100 A discrete air release location is.

In FIG. 2B, a top and side cross-sectional view of a rectangular tank 1 is shown with clarifier sidewall 2 partitioning the tank volume into two adjacent rectangular volumes, the clarifier volume being the quiescent zone, and the dilution zone. Located in the dilution zone portion is the reactor 100, with the interior of the reactor forming the mixing zone 3. The air release volume is positioned below the reactor. As shown, the clarifier sidewall 2 stops before reaching the bottom of the tank, allowing fluid communication across the clarifier sidewall 2 (the clarifier sidewall 2 in this embodiment is typically sloped to create a zone having larger volumes near the water surface than below the water surface). Also shown is a deflection plate 500 positioned at the bottom of the portion of the tank partition remote from the reactor 100 to re-direct solids settling out of this zone back into the area of the tank containing the reactor chamber.

Shown in FIG. 2C is a square tank 1, with a four sided sidewall 2 forming a pyramidal shaped truncated open bottom frustum clarifier. Shown within the clarifier interior is a reactor chamber 100, air release locations 300 positioned below the media 200 located in the reactor chamber 100, and an inlet 6 (emptying into the top of the reactor chamber) and outlet 7 located in the quiescent zone interior to the clarifier. The air distribution system is not shown in FIGS. 2A and 2C for clarity. The reactor chamber is positioned above the tank bottom and can be supported from the bottom of the tank (by using a stand), or supported from the top area or sides of the tank (or clarifier side wall) by the use of brackets or the like.

As shown, the invention can conveniently and economically be incorporated into a variety of existing treatment systems, such as by a converting septic (or anaerobic) systems into an aerobic system through incorporation of the growth media reactor and air injection system. Alternatively, the invention can be incorporated into a Hansel type aerobic system, as shown in FIGS. 1A, 2A–2C. In these types of aerobic systems, the reactor can be placed in the clarifier or external to the clarifier.

Common features of these treatment systems are inlet 6 which brings wastewater into the mixing zone (and more preferred, discharging into the mixing zone above the water level in the mixing zone) while outlet 7 removes treated waters from the treatment system external to the mixing zone, either the quiescent zone or the dilution zone. Additional common features are the placement of air release locations 300 below the reactor chamber 100 to create the air release volume. It is necessary that air diffuse upwardly through the reactor chamber. Releasing air to diffuse upwardly through the reactor provides direct contact of oxygen with the active biomass growing on the growth media within the reactor. Such direct contact promotes efficient (a) oxygen intake, (b) microbial metabolism and (c) degradation of waste matter in the wastewater. While some released air may also flow around the exterior of the reactor chamber (in which case there would be no quiescent zone), it is not preferred.

When the tank is operational, the tank will have a water level 8, generally defined by the level of the outlet discharge. The reactor chamber has an outer sidewall 101 which is positioned above the water level and is constructed of materials near the water level to fluidly isolate the mixing zone 3 and the quiescent zone 4 (or the dilution zone if the reactor is placed in the dilution zone) near the water level 8 in the tank. The growth media 200 positioned in the reactor 100 is generally located below the water level 8.

When a growth media reactor 100 is included within a clarifier structure (as shown in the previous embodiments, FIGS. 1A, 2A–2C), it may be desirable for the growth media reactor 100 to dispense with a separate sidewall 101 and use in its place the clarifier sidewall 2 as the outer chamber wall 101 (that is, the sidewall of the clarifier can function as the outer wall or sidewall of the growth media reactor, for instance, where the reactor occupies much of the internal space of the clarifier). The clarifier sidewall extends above the water surface and is impervious to wastewater (in the sense that wastewater cannot flow through the sidewall) and hence has the desired properties of a reactor sidewall.

Figure 3B:
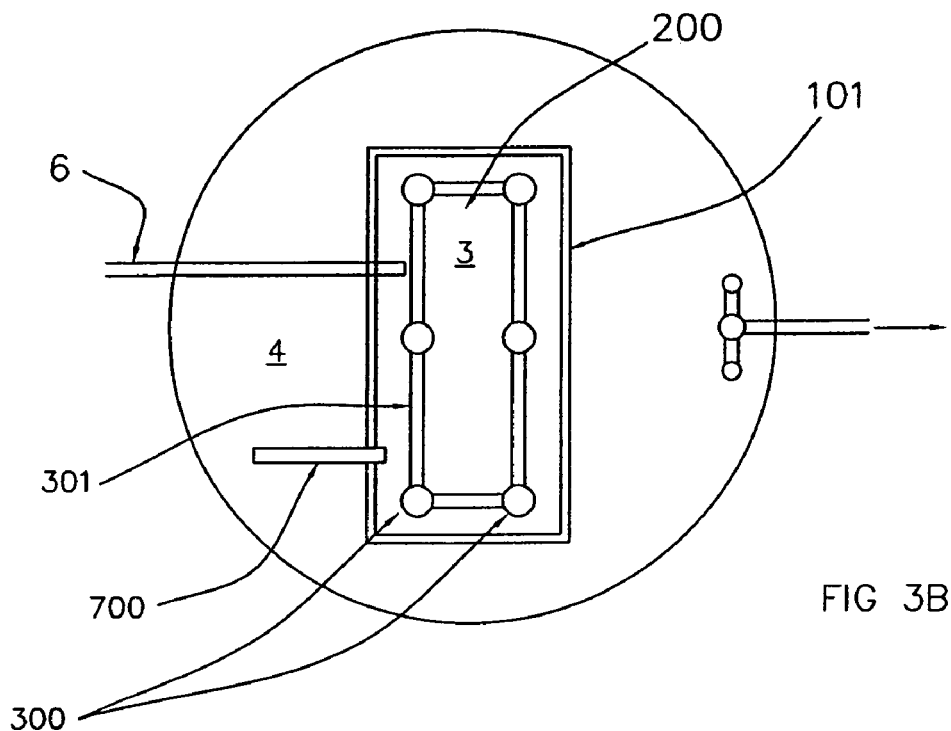
FIG. 3B is a top elevation view of the invention depicted in FIG. 3A.
Figure 3A:
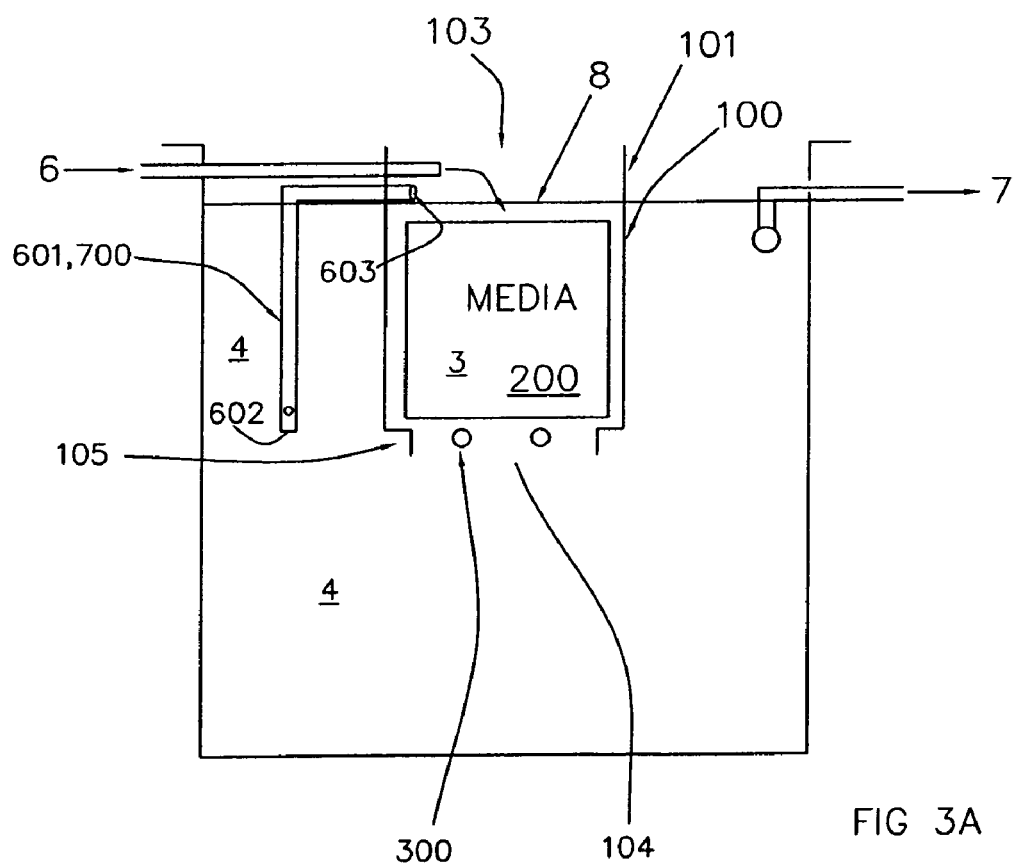
FIG. 3A is a side cross-section of an embodiment of the invention where the mixing zone is essentially the interior of the reactor.

An alternative to above mentioned treatment systems is shown in FIGS. 3A and 3B. FIG. 3 represents a "stand alone" reactor in a treatment system, not utilizing or incorporating a separate clarifier structure. In this embodiment, the treatment tank has three recognizable volumes or zones: (1) the mixing zone interior to the reactor; (2) the air release volume, the volume generally below the reactor where air is released or injected into the treatment system; and (3) the remainder of the treatment tank, considered the dilution zone. As shown in FIG. 3A, the growth media reactor 100 has an outer sidewall 101 forming a chamber having a substantially opened top 103 and bottom 104. Also shown is recirculation means 700 later described.

B. The Growth Media Reactor

For the embodiment of FIG. 3A, the growth media reactor 100 has an outer wall or outer sidewall 101 which extends above the upper surface of the media positioned within the reactor extends above the water level 8 in the treatment system. The outer walls 101 are impermeable to wastewater near the water level in the system to fluidly isolate the interior of the reactor chamber near the water level from the other surface waters in the tank. In general, the sidewall will be impervious or impermeable to wastewaters along the entire length of the reactor chamber. In FIG. 3A, the mixing zone 3 is in fluid communication with the remainder of the treatment system through the open bottom 104 of the outer walls 101 of the growth media reactor 100. Inlet 6 is positioned to release waters into the top of the growth media reactor 100. Located in the interior of the growth media reactor 100 is the growth media 200 which provides the attachment surfaces to which colonies of bacteria adhere to. It is preferred that the upper surface of the growth media 200, positioned within in the reactor walls 101, be below the water level 8 to allow for distribution of incoming wastewater across at least a portion of the top surface of the reactor.

Figure 8A:
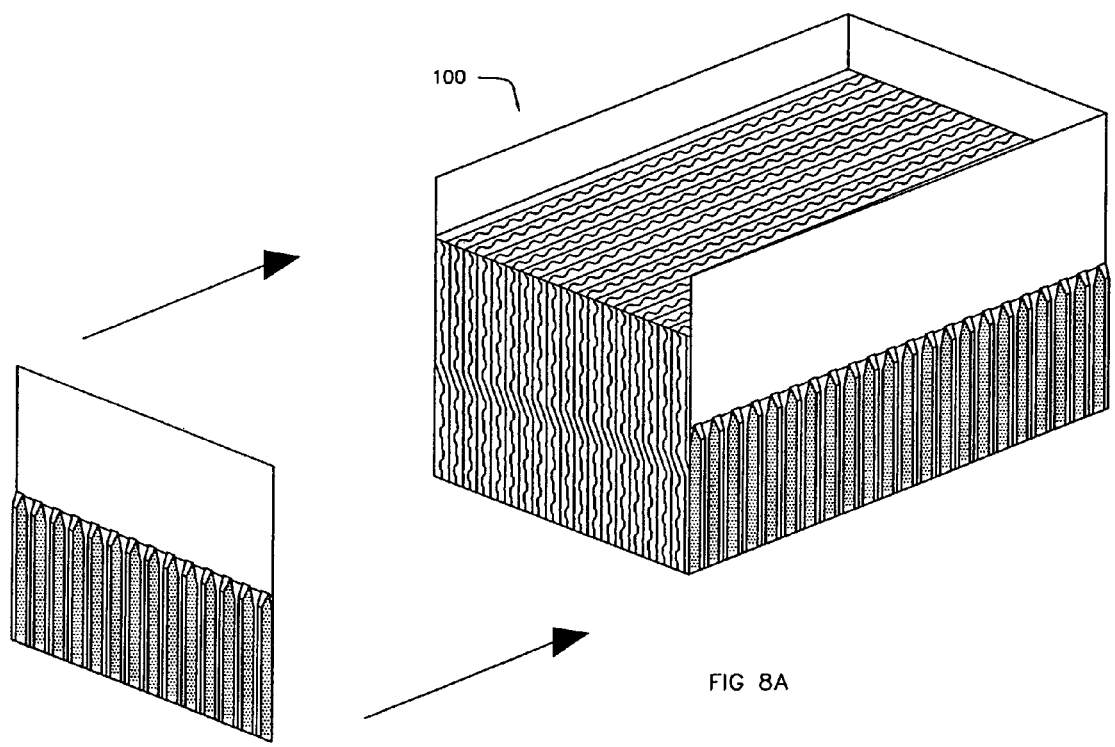
FIG. 8A is a prospective view of a reactor having vertical cross flow fixed channels where the sidewalls are constructed from the vertical flow media panels.
Figure 8B:
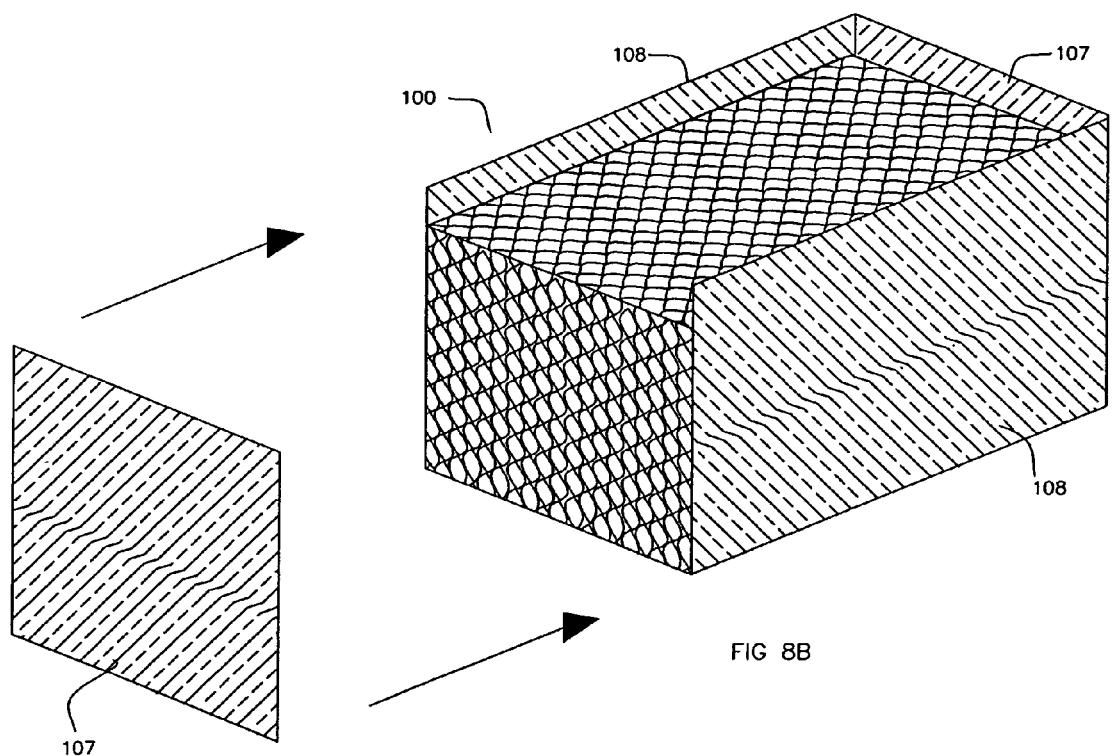
FIG. 8B is a prospective view of a reactor having cross flow fixed channels where the sidewalls are constructed from the cross flow media panels.

If the growth media 200 is formed from impervious panels, the outer walls 101 of the growth media reactor 100 may be partially or wholly formed by panels (shown in FIG. 8B). Positioned below the growth media 200 in the growth media reactor 100 is the air release sites or sites 300. As shown in FIGS. 3A and 3B, six air release sites 300 are provided and are distributed near the bottom portion of the reactor 100 close to the bottom surface of the growth media 200 (again, the air distribution manifold is not fully shown).

In all embodiments, the inlet 6 empties into the top portion of the growth media reactor 100 which is isolated from the adjacent surface waters of the quiescent zone or dilution zone by the sidewall 101 or outer wall of the mixing zone. This inlet location is desired to insure that inlet waters, upon entering the treatment system, pass through a substantial portion of the growth media prior to entering the dilution zone to be diluted with the large volume of water present in the dilution zone. In this fashion, incoming high-strength (high BOD) wastewaters will be exposed to the biomass for more efficient treatment than would be possible with diluted (lower BOD) wastewater if the inlet were located in the dilution zone.

An additional feature shown in FIG. 3A is that the outer walls 101 of the reactor chamber 100 extend downwardly past the air release locations 300. This aspect of the device "shields" the air release locations or the air release volume from the dilution zone (or quiescent zone) to insure that air released at the release locations travel through the mixing zone 3 and not elsewhere. This shield or skirt portion 105 may be a separate structure attached to the growth media reactor, the air distribution manifold or other structure, or dispensed with all together.

Growth media 200 is positioned slightly below the water surface 8 in the growth media reactor 100 (approximately 1–2 inches below the surface, although greater depths could be used). This placement of the growth media 200 allows the incoming wastewaters to be distributed across a large portion of the top surface of the reactor allowing the incoming waters access to a large portion of the reactor volume for "presentation" to the biomass in the reactor volume for treatment. While not preferred, the growth media 200 may be positioned at the water level 8 and mixing and distribution across the top surface will be accomplished by upwardly flowing currents induced by air released from the air release locations.

Shown in FIG. 4 is another embodiment of the reaction chamber 100. In this embodiment, the reactor chamber has a top 110 and a bottom section 130, and the air release volume 120 is located within the reactor between the top and bottom sections. Disposed in portions of the top and bottom sections are growth media. Located in the intermediary section 120 are the air release locations or site(s) 300. It is preferred that growth media 200 substantially fill the top section 110, but may not necessarily fill the bottom section 130. The growth media 200 disposed in the top section 110 and the bottom section 130 may have different characteristics.

C. The Growth Media.

Growth media 200 is media that provides a surface area for bacteria/microbes to attach and grow on to develop an active, thriving biomass. The growth media is positioned within the growth media reactor 100. It is preferred that the growth media be positioned in the growth media reactor below the water level in the mixing zone, as shown in FIGS. 2 and 3.

Preferred growth media is a fixed channel media consisting of a series of fixed corrugated panels. As used herein, "fixed channel media" is used to define a growth media that creates spatially fixed paths where the path is spatially invariant as opposed to a spatially variant path as would be present when the growth media is free floating loose media, such as disclosed in U.S. Pat. No. 5,911,877 (FIG. 3) to Perez (incorporated by reference). "Fixed channel cross-flow media" means a fixed channel media where a particular channel or path is in fluid communication at locations along a portion of the channel length with at least one adjacent or near by channels. Non-cross flow fixed channel media would hence be fixed channels with substantially no fluid communication between adjacent or nearby channels along the channel's length. Types of fixed channel media are disclosed in U.S. Pat. Nos. 5,217,788 and 5,384,178, herein incorporated by reference.

One type of fixed channel media are corrugated panels positioned in a vertical orientation so that the corrugations created a plurality of fixed upwardly orientated channels or pathways through which air, when released under the panels, travels upwardly through the channels to the surface waters in the mixing zone. Two types of fixed channel growth media are preferred, that being cross flow media and vertical flow media manufactured by Brentwood Industries of Reading, Pa. Both types of media are composed of a series of corrugated plastic panels as described in the Brentwood brochures, incorporated by reference.

Figure 5A:
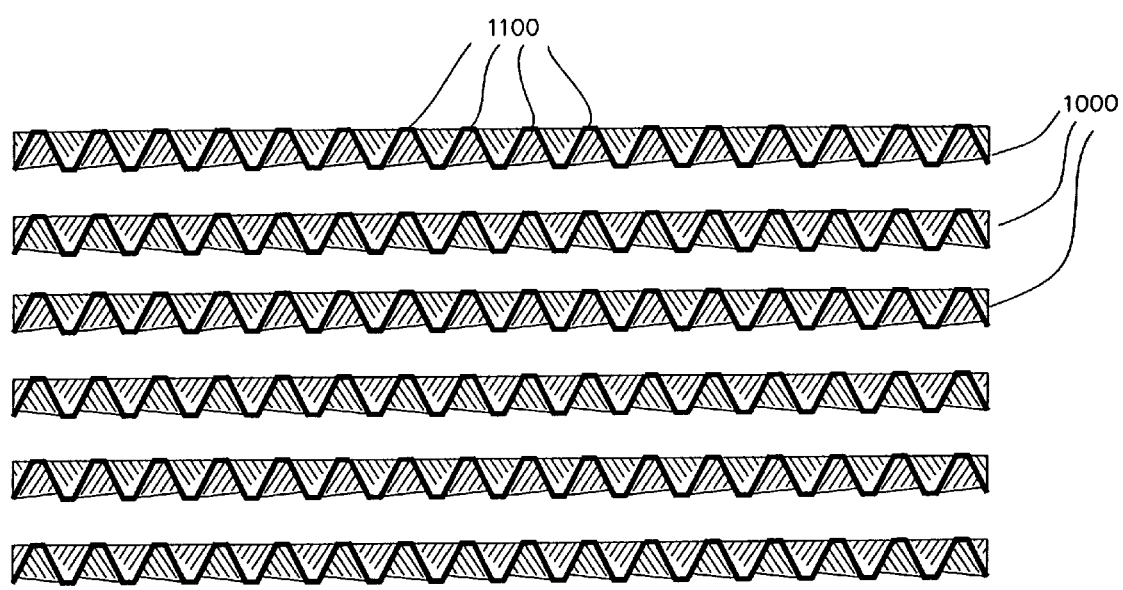
FIG. 5A is a side view (edge on) of six cross flow panels.
Figure 5B:
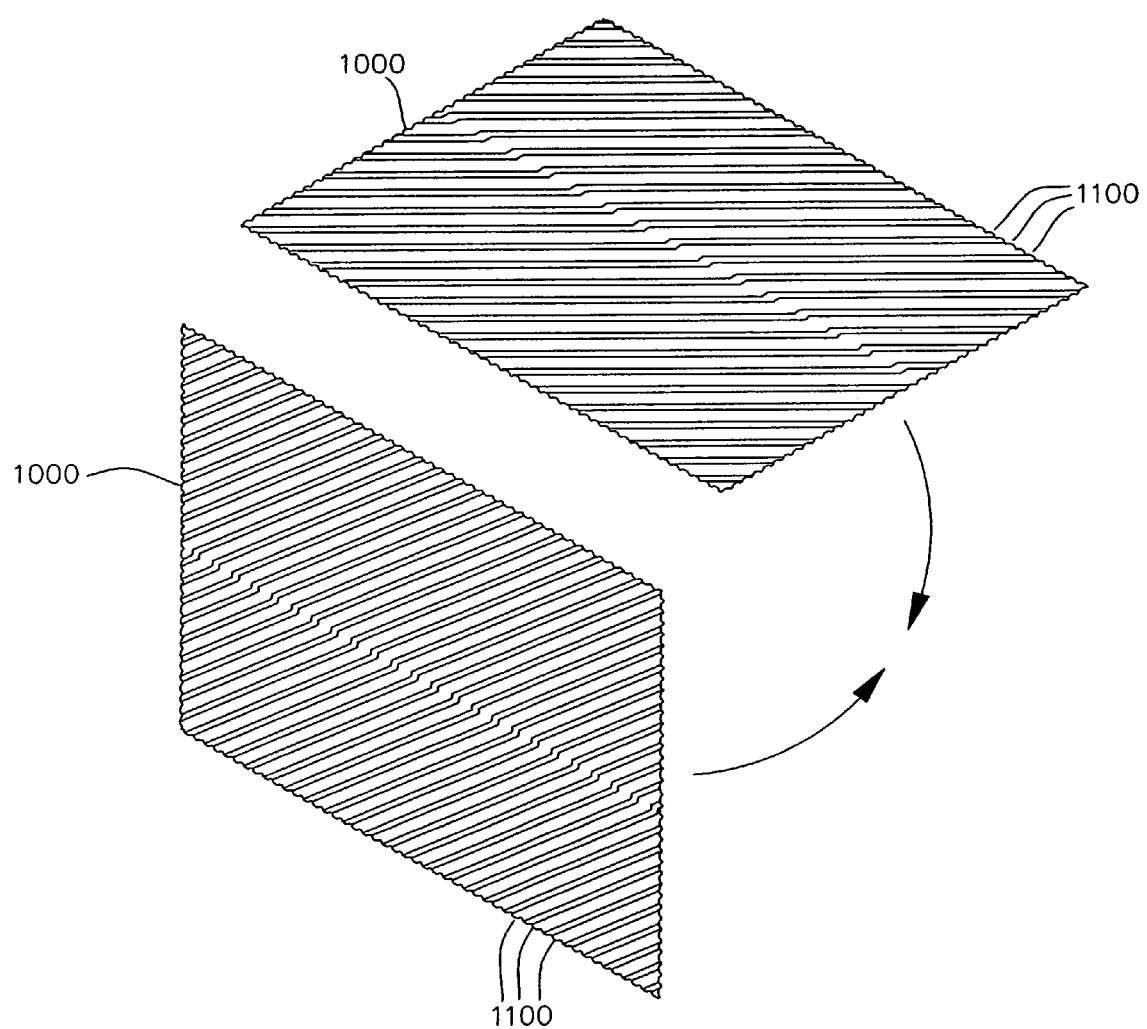
FIG. 5B is a prospective view of two adjacent cross flow panels showing the orientation of the corrugations on adjacent sheets as being opposed.

In the Brentwood cross flow media shown in FIG. 5A (an edge on view), each corrugated panel 1000 has corrugations 1100 placed at an angle to the vertical (in one embodiment, the angle is about 45–60 degrees degrees). As shown in FIG. 5B, adjacent panels 1000 are positioned in a mirror image arrangement so that the corrugations on adjacent panels are orientated in the opposite direction from the adjacent panels (for instance, if one panel has corrugations at +60 degrees from the vertical, the next panel [if the angle is kept constant] would have corrugations orientated at −60 degrees from the vertical). This arrangement is accomplished by "flipping" or rotating adjacent panels about the vertical centerline, demonstrated in FIG. 5B.

This arrangement of adjacent sheets creates a criss-crossing pattern of opposed corrugations on adjacent sheets. Each corrugation creates an upwardly directed fixed channel which crosses or opens into a series of opposed corrugations formed by the adjacent panel. Each channel or corrugation is in fluid communication with each crossing channel or corrugation of the adjacent sheet. Hence, air released beneath adjacent sheets will take a zigzag path through the opposing sheets, eventually to reach the surface water. Such a zigzag path allows released air to be in contact with the growth media for a longer period of time, promoting oxygen transfer to the biomass. The zigzag pattern also promotes mixing/redistribution of the wastewater within the media.

Figure 7:
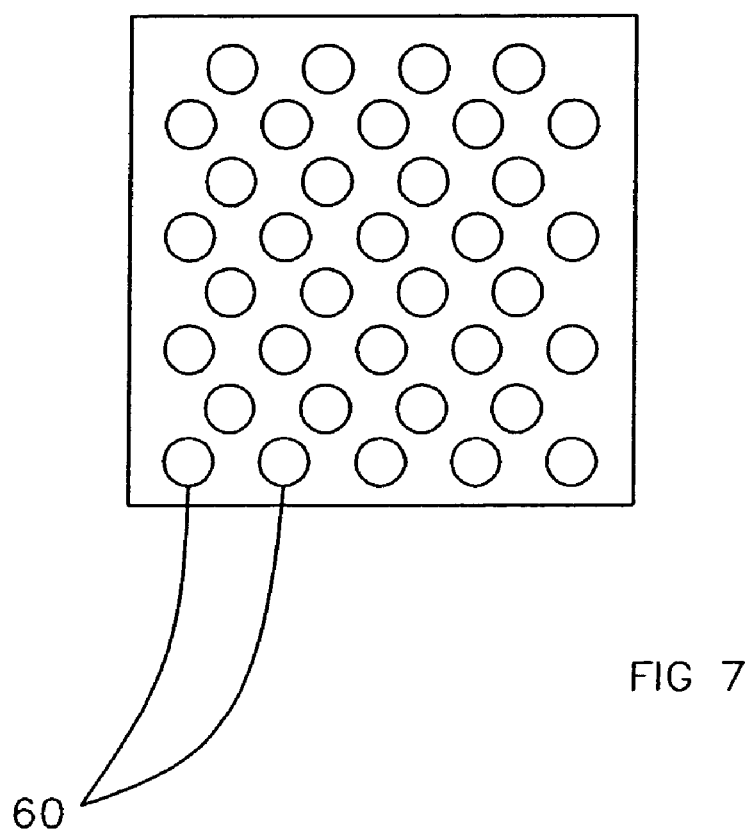
FIG. 7 shows a front elevation view of a fixed channel media panel having a series of dimples creating a series of fixed channel cross flow paths.

The panels are sufficiently rough or roughened to provide an attachment surface for bacteria. Other types of fixed panel or fixed channel designs will also provide upwardly directed channels with criss-crossing paths. For instance, panels constructed with discrete indentations or dimples 60 orientated along an angle, as shown in FIG. 7, will also provide a zigzag path with fluid communication across the entire width of adjacent panels. It may also be desirable to have fluid communication between adjacent panels, such as by providing cutouts in the panels.

Figure 6A:
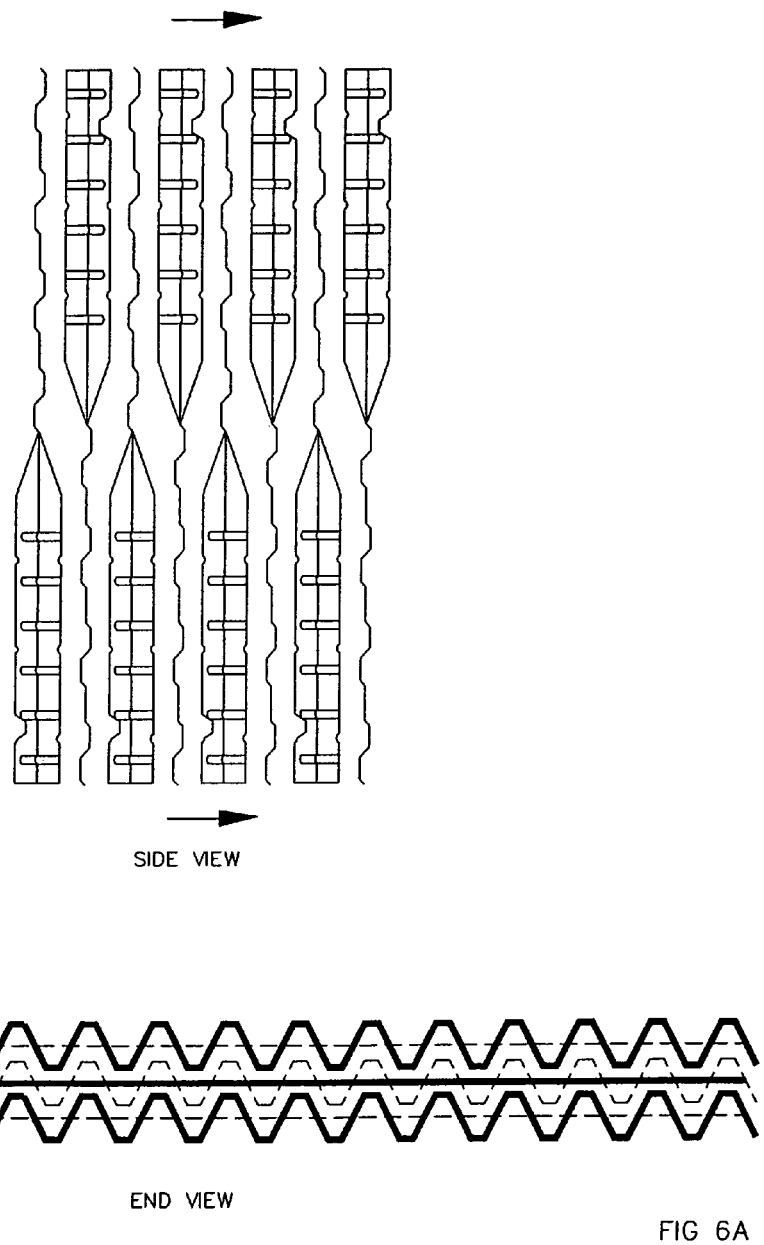
FIG. 6A is a side view of two adjacent panels of vertical flow fixed channel media.
Figure 6B:
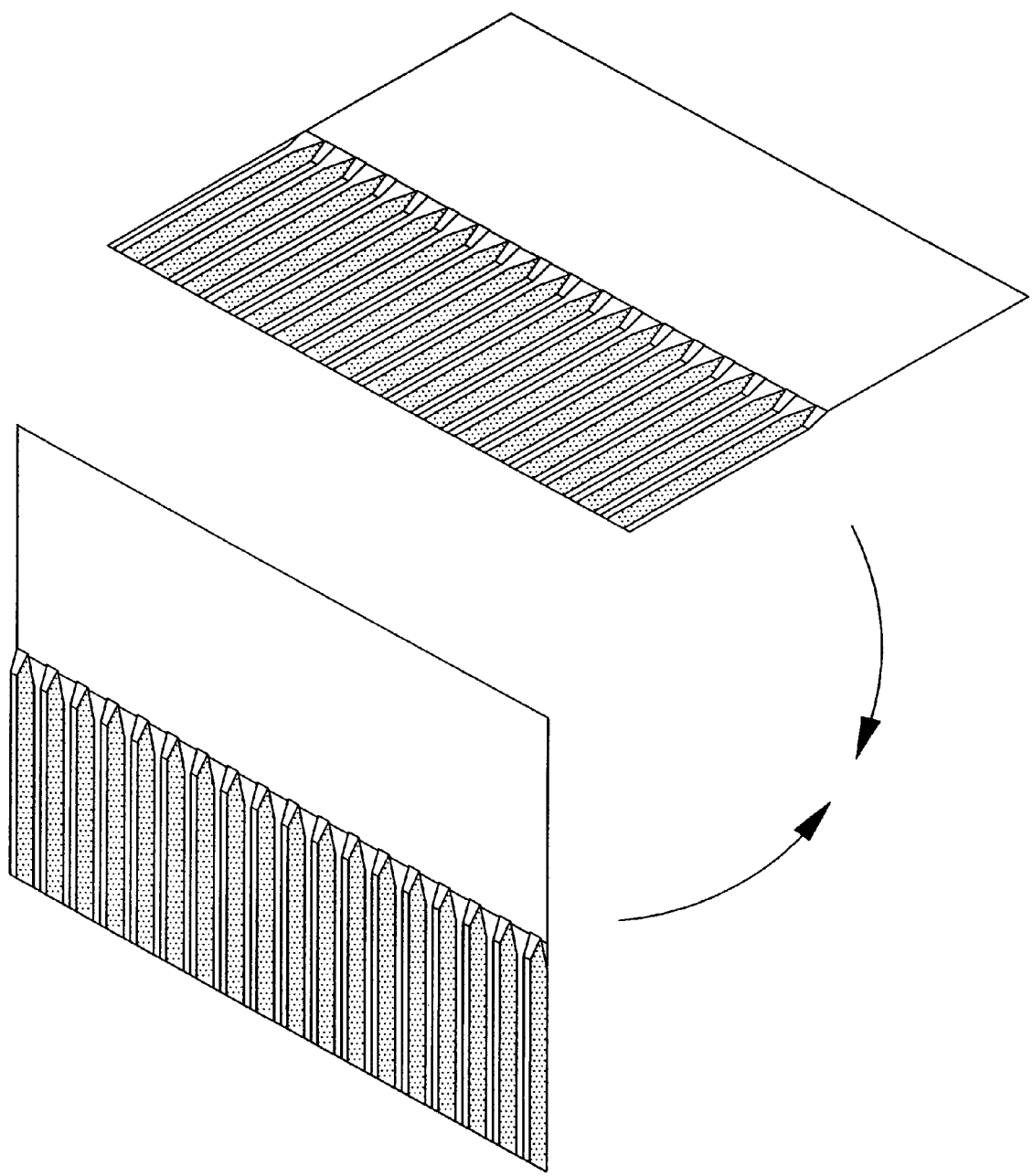
FIG. 6B is a prospective view of two adjacent panels of vertical flow fixed channel media.

Another type of fixed channel media is the Brentwood vertical flow panels shown in FIG. 6. These panels have substantially vertically orientated corrugations half way up the panel (the bottom), with the second half of the panel being substantially planar without corrugations (the top). Adjacent panels are placed with the top of one placed adjacent the bottom of the adjacent panel, as indicated in FIG. 6B. Vertical flow panels can also be formed from discretely formed channels (such as tubes) and stacked together to created a honeycomb of vertical channels. The corrugations can be at an angle from the vertical, or substantially vertically formed, as shown in FIG. 6B. Vertical flow channel media allows the upward travel of air released below the media to proceed with few changes of direction, that is, with few zigzag paths available. Obviously, if the vertical paths are orientated on an angle, the upward path of air will be angular, but generally not a zigzag path as would occur in cross flow media. As used herein, "vertical flow fixed channel media" is used to define a growth media that creates spatially fixed channels substantially vertically orientated. Such media may have some sharp channel path directional changes, such as embodied by the Brentwood Industries vertical flow media.

When fixed channel media is employed, the outer walls 101 of the growth media reactor 100 may be formed from the panels of the fixed channel growth media. For instance, if using a cube formed from a series of the cross flow media panels, the two terminal side panels 108 will form two outer opposing walls (non-porous along the length). The remaining two side walls of the reactor can be formed from two panels 107, vertically orientated, but orientated at 90 degrees for the remaining panel media, as shown in FIG. 8B. In this case, it is preferred that the four panels composing the outer side walls (107 and 108) of the reactor extend vertically above the horizontal level of the remaining panels to fluidly isolate the interior of the growth media reactor near the water level from the exterior volume adjacent to top of the growth media reactor. Because this is fairly cumbersome to construct, the growth media may be placed in a separate open top and bottom plastic or fiberglass chamber.

Figure 9:
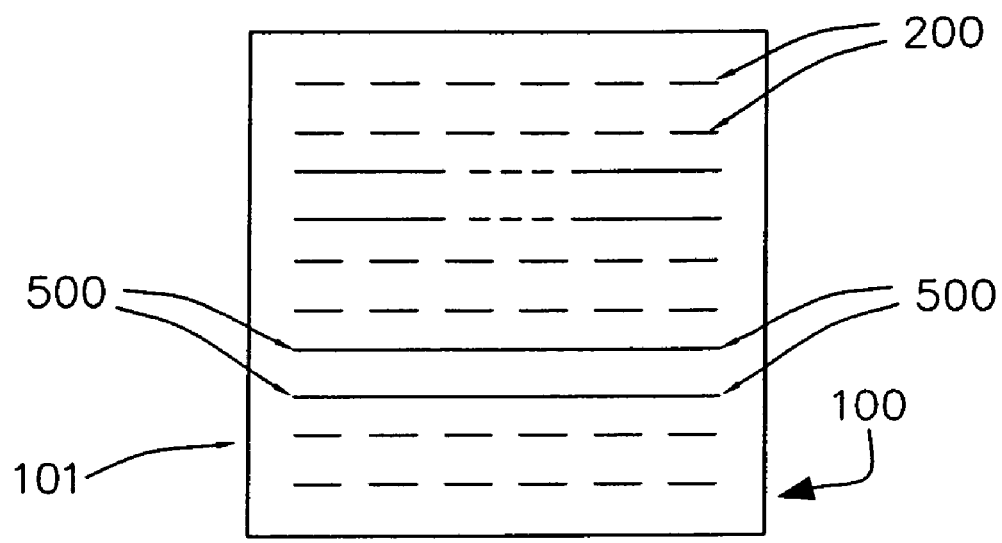
FIG. 9 is a top cross-sectional view of a reactor showing a the media sheets, where some portion of the sheets extends above the water level.

Shown in FIG. 9 is a top view of a growth media reactor 100 having a series of parallel sheets 200 as growth media. As shown, portions 500 of the sheets in the reactor 100 extend above the water level (those portions shown in solid lines are located above the water level, while the dotted lines represent those portions below the water line). By suitable placement of some portions of the sheeted growth media above the water level, a designer can direct the surface flows through the growth media reactor in a desired pattern.

Other types of growth media can be used. For instance, instead of corrugated sheets of solid plastic, fiberglass sheets can be used or other type of fixed film media. Corrugated sheets formed from a porous or semi-porous material could also be utilized, such as semi-porous stiff foam. Such semi-porous sheets provide for some degree of fluid communication through the sheet and also provide additional locations for bacteria to attach and grow.

As shown in FIG. 2A, air release locations 300 are positioned below the growth media to allow released air to travel up and disperse through the growth media. Several air release locations 300 are shown. The released air creates a circulation pattern within the growth media reactor 100: released air is entrained in rising waters to create an upward flow through the growth media reactor. When the upward flowing waters reach the surface of the growth media reactor, the waters must flow downward back through the growth media reactor as the top volume portion of the growth media reactor is fluidly isolated from the other surface waters in the treatment system. Waters exit the reactor from the bottom volume of the reactor (either through the open bottom of the reactor, or through downward flow paths which open on the sides of the reactor). Portions of the downward flowing waters, upon exiting the growth media, will be re-directed upward by the induced upward current created by the released air to pass again through the growth media reactor for further treatment. The remaining portions of the downward flowing waters will enter the dilution zone. A circulation pattern is thus established within the reactor, and indeed, the current induced by the air injection will induce an overall circulation pattern in the treatment system.

The current induced within the treatment system will eventually bring waters remote from the mixing chamber (that is, within the dilution zone and the quiescent zone, if present) back to the reactor for further treatment. How quickly remote waters are returned to the reactor depend on the strength of the induced current. The strength of the induced current will depend on the ability of the released air and entrained waters to flow through the reactor chamber. In general, the more circuitous the route through the reactor chamber, the weaker the induced current. Additionally, if the channels in the fixed channel media are small or the released air not flowing at a sufficient rate, a weak current will be induced. If the induced current is too weak, insufficient mixing throughout the entire wastewater treatment system may occur. That is, the induced current may be too weak to timely bring waters in the treatment system remote from the reactor to the reactor for treatment. In this instance, a recirculation means may be employed.

A recirculation means recirculates waters from the dilution zone back into the treatment chamber. One recirculation means is shown in FIG. 3. In this embodiment, the recirculation means 700 includes a tube or pipe with open ends, one end (the suction end 602) being placed in the dilution zone, and the other end 603 will empty into the top of the reactor. As shown, the discharge end 603 is shown placed above the water level in the top of the reactor. The discharge end could also be placed below the water level in the reactor. If the treatment system includes a clarifier, it is preferred that the suction end of the recirculation means be positioned in dilution zone, not the quiescent zone. Location of the suction end 602 is not critical, but it should not be too close to the bottom (to avoid sucking in bottom sludge) and it is desirable that the suction end be remote from the outlet or discharge 7. It is desired that the water volume near the outlet be calm (to allow suspended solids to settle out prior of the waters prior to discharge), and hence, the suction end should be remote from the outlet 7. The suction end 602 can be placed adjacent to the bottom of the reactor chamber but removed from the air injection volume.

Alternatively, to create supplemental flow through the reactor, an existing air release location located underneath the reactor could be used. In this instance, a vertical flow channel (a 2 inch cross section pipe, for instance) would be placed through the reactor and located above the selected air release site. Such an arrangement is shown as reference 800 in FIG. 2A.

Air from the compressor or other source is injected into the air lift tube 601 near the suction end 602. Air can be drawn from the air distribution manifold, such as by a flexible hose or fixed tubing, for this purpose. The injected air will rise up with entrained water to empty into the top of the rector chamber creating an addition flow of waters into the top of the reactor. Because the suction end 602 is located in the dilution zone, it is desired that substantially all air injected into the air lift tube 601 remains within the tube and does not escape into the quiescent zone.

If supplemental recirculation is needed, use of the air lift pump as a recirculation means is convenient and efficient as the present treatment system uses air for injection into the system under the reactor media and the air distribution manifold can be tapped for delivering air into the recirculation pipe. Obviously, other types of pumps could be used to drive a recirculation means, such as a centrifugal pump. Using a recirculation means, a supplemental current is created in the dilution zone to help cycle waters in this zone back through the reactor chamber for further treatment.

The induced current also induces a circulation pattern in the mixing zone, that is, within the interior of the reactor: upward flow along a first portion of the growth media reactor and downward flow in a second portion of the growth media reactor. This pattern may not be stable, but vary over a period of time. However, by suitable choice of airdrop placement and/or selection of types of fixed media channels, the reactor unit can be designed to produce a fairly stationary current pattern within the reactor volume: a portion of the reactor designed for upward flow, and a portion designed for downward flow.

Figure 10:
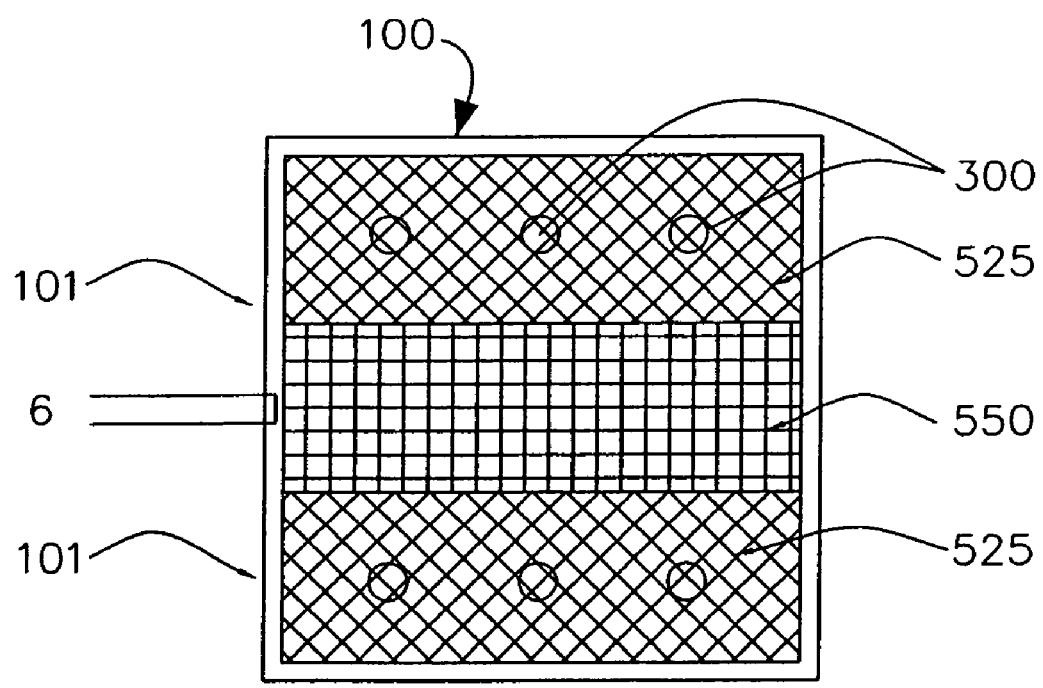
FIG. 10 shows a cross-section view of a reactor having a mixture of vertical flow and cross flow media panels.

It may be desirable to vary the characteristics of the growth media in the growth media reactor 100 to take advantage of the circulation pattern within the reactor. For instance, a mixture of both vertical and cross flow fixed channel media in the reactor chamber can be utilized, with cross flow fixed channel media 525 positioned below and adjacent to the air release locations, and with vertical flow fixed channel media 550 positioned elsewhere in the growth media reactor, one such embodiment is shown in the top view of the reactor shown in FIG. 10. In this embodiment, air injection occurs below cross flow media 525 and hence upward flows of waters will occur substantially in the cross flow media 525. Downward flow occurs in the center of the reactor through the vertical flow media 550. The velocity of the upward flow is determined by the rate of air injection, the number of injector locations, and the type and volume of the media employed. The down flow rate is dependent upon the type and volume of media employed for down flow in relationship to the volume of upward flow (obviously the upward flow must equal the downward flow). For instance, by enlarging the middle volume of the reactor chamber in FIG. 10, the down flow rate through the center can be slowed.

Using two different media characteristics for the two flow paths allows the designer to tailor the reactor's growth surfaces for different properties of the upward flowing and downward flowing waters. Waters flow upward with entrained air providing increased mixing and oxygen transfer and some scouring of the growth media walls by the rising air bubbles. Waters descending through the reactor lack entrained air bubbles, and hence, less scouring of the walls will occur on the portions of the growth reactor accommodating downward flow. With less scouring and/or possible decreased downward flow velocity, the minimum cross sectional area of the downward flowing channels can be increased (with respect to the media accommodating upward flow) to accommodate heavier build up of bacterial growth, or build up of an alternate type of bacterial growth.

A pretreatment tank can be placed in series with the current wastewater treatment system, with waters from the pretreatment tank delivered to the mixing zone. Additionally, a post-treatment tank can also be utilized in series with the output of the present wastewater treatment system, with waters from the quiescent or dilution zone being the input to the post treatment tank, such as discussed in Cormier, U.S. Pat. No. 6,093,316, incorporated herein by reference.

D. Operation

While the fixed media growth reactor is highly efficient due to the high concentration of treating biomass (it is estimated that a single pass through the system may remove as much as 70% of the wastes), treatment requires a cycling of waters through the reactor. In most applications, the present treatment system operates in cycles: incoming wastes do not enter the system in a continuous flow, but enter the system in pulses or doses. For instance, in home systems, the system will be pulsed during the mornings and the evenings when bathrooms are heavily utilized. During the day, the treatment system may not be pulsed at all, or pulsed infrequently. Alternatively, input to the treatment system may be accomplished from a pretreatment dosing tank, wherein a dosing pump operates to pump waters to the treatment system when the waters in the dosing tank exceed a given level.

When the system is being pulsed, incoming wastes will be directly fed to the reactor for efficient treatment. When not being pulsed (that is, the system is dormant), it is desirable to continue treating the fluids in the treatment system, that is, treat the waters in the mixing zone and the dilution zone. In these dormant periods the treatment system continues to operate to treat the water in the system by drawing wastes to the reactor for treatment by cycling waters through the reactor though injection of air at the air release sites (generally, air is continuously injected into the system, unless trying to induce a period of low oxygen levels to achieve denitrification).

The type of treatment system described is not believed suitable for large wastewater treatment systems (treating over 12,000 gallons/day), as in large systems, influent will be fairly continuous during the day. In these types of large, usually municipal, treatment plants, it is believed that the volume of media required to effectively achieve effluent standards reaches unmanageable/uneconomic limits. The present system is designed to function in intermittent flows, such as heavy flows in the morning and evening, and lighter and intermittent flows at other times. The system is substantially constant volume—volume input is matched by volume output.

As new influent enters the treatment system on the top surface of the reactor, the new influent must thus pass through the reactor and come into contact with the active biomass (at least once on the downward flow). This is substantially different from treatment systems where influent enters the system elsewhere in the treating system, as entry elsewhere implies that the influent is mixed with other wastewater and effectively diluted prior to treatment. The diluted wastewaters now take longer to treat. For instance, if incoming wastewaters are diluted by a factor of 10 before entering the treatment reactor, then it will take 10 times longer to treat the same amount of wastes, as now ten times the wastewater must pass through the reactor to present the same wastes to the biomass (this is somewhat simplistic, as it assumes complete mixing).

The present system relies upon direct contact and dilution to meet treatment standards. The dilution acts to absorb and dilute wastes after new influent passes at least once through the reactor, allowing the overall system (reactor and dilution zone/quiescent zone waters) to meet wastewater effluent standards. For instance, assume 300 BOD wastewaters are influent, a 70% efficiency for the reactor, and dilution in the larger dilution zone by a factor of 10. Also assume effluent standard is 25 BOD (Biological Oxygen Demand—a measure of waste strength, other standards also come into play, such as Total Suspended Solids (TSS), nitrate levels, fecal coliform levels, etc). If 300 BOD waters were positioned in the dilution zone prior to entering the reactor, the dilutive effect results in an average BOD of 30 (factor of ten dilution). Contrast these levels with that of the present system, where the 300 BOD waters passes through the bioreactor once and the resulting BOD, after a single pass of the influent through the reactor, would be reduced to 90 BOD (70% efficiency (the higher reactor efficiency is attributable to aeration under the reactor and the ability present high BOD wastes to the biomass without dilution effects)). After dilution of this preliminary treated water, the strength of the waters in the treatment tank is now 9 (factor of ten dilution). Hence, in this instance, the treatment system increased performance by a factor of 3, making effluent standards more readily achievable.

In period of low flows (or the system at rest), the system cycles waters through the reactor to remove wastes, dropping the waste levels in the wastewater and preparing the system for the next pulse of high strength wastewaters. In period of influent, the high strength incoming influent shocks the system by raising overall BOD levels, but the high BOD waters are treated initially in the reactor and the remaining wastes are diluted in the quiescent zone allowing the system to absorb the shock and to maintain effluent standards. If the system had no periods of rest (low or no influent), wastewater BOD levels (and other pertinent performance characteristics) would slowly rise in the tank despite efficient treatment by the bioreactor, as the system can not "keep up" or process the continuous influent quickly enough. At some point, the system would fail to meet effluent standards. During the rest periods, the treatment system "recovers" from a prior period of influent by continuing to treat the diluted wastewater reducing further the BOD levels without having to treat new influent. Obviously, a larger dilution zone (larger volume) allows the system to adapt to longer influent flows or higher strength influent flows and still maintain effluent standards. As described, the reactor could be utilized with no clarifier structure or an internal clarifier.

One embodiment structured as in FIG. 3 used a 700 gallon tank (system capacity of treating about 500–700 gallons/day of typical domestic strength wastewater (180–300 BOD, and TSS) with a 2'×2'×4' block of fixed channel media (placed in a 2'×3'×4' chamber to isolate the top of the media from the quiescent zone), utilizing six air release locations (release was effected through ¾ PVC tubing) connected to a compressor running at six c.f.m. Good quality effluent was obtained over an extended period. The system was also run using a single supplemental air lift pump for recirculation, producing a supplemental flow of 10 gallons/minute into the top of reactor (tapping the existing air manifold and using a 2 inch pipe as the airlift tube). Using the supplemental air lift pump, it was found that the treatment center more readily meet requirements for start-up and vacation. For a 2'×2'×4' reactor, tank sizes in the 200–2100 gallons range should produce a reasonable treatment effluent quality; and in general, for a given reactor volume, the ratio of reactor volume to total tank volume in the range of about 0.05 to about 0.5985 should produce a reasonable treatment effluent quality.

We claim:
1. A treatment system comprising:
   (a) a tank for processing wastewater, said tank having a water level;
   (b) a growth media reactor positioned in said tank, said growth media reactor having at least one outer sidewall defining an interior forming a mixing zone, said at least one outer sidewall extending above said water level, said outer sidewall adapted to fluidly isolate said interior of said reactor from the exterior of said reactor near said water level;
   (c) growth media positioned in said interior of said growth media reactor;
   (d) an inlet feeding wastewaters external to said tank for treatment in said treatment system, said inlet discharging into said mixing zone;
   (e) an outlet removing waters from said treatment system, said outlet exterior to said growth media reactor; and
   (f) at least one air discharge site adapted to be connected to an air source, said air discharge site positioned so that air released from said air discharge site will substantially flow and disperse upwardly through said growth media;
where the ratio of the growth media reactor volume to the tank volume is no more than about 0.5984.

2. A treatment system according to claim 1 wherein said growth media comprises fixed channel growth media.

3. A treatment system according to claim 2 wherein said at least one sidewall is partially formed by a portion of said fixed channel growth media.

4. A treatment system according to claim 2 wherein said fixed channel growth media comprises a first component media and a second component media, said mixing zone having a wastewater circulation path having an upward flow portion and a downward flow portion, said upward flow portion substantially flowing through said first component media, said downward flow substantially flowing through said second component media.

5. A treatment system according to claim as in claim 4 wherein said first component media and said second component media each form channels having a respective minimum cross-sectional area, said minimum cross-sectional area of said first component media being smaller than said cross-sectional area of said second component media.

6. A treatment system according to claim 2 wherein said fixed channel growth media has a first component having cross flow channels.

7. A treatment system according to claim 6 wherein said fixed channel media has a second component substantially lacking cross flow channels.

8. A treatment system according to claim 6 wherein said cross flow channels are orientated at an angle from the vertical.

9. A treatment system according to claim 2 wherein said fixed channel growth media is composed of a series of vertically orientated panels forming channels between adjacent panels.

10. A treatment system according to claim 1 wherein said at least one side wall is substantially impermeable to wastewater.

11. The wastewater treatment system according to claim 1 further having a pretreatment tank, said pretreatment tank positioned in said treatment system so that wastewaters flow serially from said pretreatment tank to said inlet in said tank.

12. The wastewater treatment system of claim 1 further having recirculation means adapted to circulate waters in said tank external said mixing zone into said mixing zone.

13. The wastewater treatment system of claim 12 wherein said recirculation means includes an air lift tube having a discharge end and a suction end, said discharge end located in said mixing zone, said suction end located external to said mixing zone.

14. A treatment system comprising:
   (a) a tank for processing wastewater, said tank having a water level;
   (b) a clarifier positioned in said tank defining a quiescent zone;
   (c) a growth media reactor positioned in said clarifier, said growth media reactor having a least one outer sidewall defining an interior forming a mixing zone, said at least one outer sidewall extending above said water level, said outer sidewall adapted to fluidly isolate, in a region adjacent to said water level, said mixing zone from the exterior of said mixing zone;
   (d) growth media positioned in said interior of said growth media reactor; an inlet feeding wastewaters external to said tank for treatment in said treatment system, said inlet discharging into said mixing zone;
   (e) an outlet removing waters from said quiescent zone; and
   (f) at least one air discharge site adapted to be connected to an air source, said air discharge site positioned so that air released from said air discharge site will substantially flow and disperse upwardly through said growth media where the ratio of the growth media reactor volume to the tank volume is no more than about 0.5984.

15. The treatment system of claim 11 further having a recirculation means includes an air lift tube having a discharge end and a suction end, said discharge end located in said mixing zone, said suction end located external said mixing zone.

16. The treatment system of claim 15 wherein said recirculation means further includes an air release location positioned in said air lift tube near said suction end of said air lift tube.

17. A treatment system comprising:
   (a) a tank for processing wastewater, said tank having a mixing zone and a dilution zone separated by at least one sidewall positioned in said tank; said mixing zone having a bottom portion in fluid communication with said dilution zone; said dilution zone and said mixing zone having a water level; said mixing zone and said dilution zone being fluidly isolated near said water level; said mixing zone having a top, intermediary and bottom section, with growth media positioned in said top and said bottom section, said growth media in said top section having an upper portion positioned at or below said water level in said mixing zone;
   (b) an inlet positioned in said tank to discharge into said mixing zone near said water level;
   (c) an outlet positioned in said dilution zone, said outlet located at or below said water level in said dilution zone; and
   (d) an air discharge site adapted to be connected to an air source, said air discharge site located in said intermediary section of said mixing zone.

18. A treatment system comprising:
   (a) a tank for processing wastewater, said tank having a mixing zone and a dilution zone separated by at least one sidewall positioned in said tank; where the ratio of the mixing zone volume and the tank volume is no more than about 0.5984, said mixing zone having a bottom portion in fluid communication with said dilution zone;

(b) said dilution zone and said mixing zone having a water level; said mixing zone and said dilution zone being fluidly isolated near said water level;

(c) an inlet positioned in said tank to discharge into said mixing zone near said water level;

(d) an outlet positioned in said dilution zone, said outlet located at or below said water level in said dilution zone;

(e) growth media positioned in said mixing zone, said growth media having an upper portion and a lower portion, said upper portion positioned at or below said water level in said mixing zone and a lower portion positioned near said bottom of said mixing chamber; and (f) an air discharge site adapted to be connected to an air source, said air discharge site located near said lower portion of said growth media and positioned so that air released from said air release site will substantially flow upward diffusing only through said mixing zone.

19. A reactor chamber for use in a wastewater treatment system, said reactor chamber having a chamber formed from at least one sidewall forming the interior of said chamber, said chamber having a bottom portion in fluid communication with volumes external to said interior, said interior of said chamber forming a mixing zone having a top surface portion; said sidewall having a top portion and a bottom portion; fixed channel growth media positioned in said interior of said chamber, said fixed channel growth media positioned below said top of said sidewall, said top of said sidewall being substantially impermeable to wastewaters; an air distribution manifold system having a series of air release sites positioned below said fixed channel growth media and adapted to disperse air upwardly through said fixed channel growth media; and a recirculation means comprising an airlift tube connected to said chamber having a suction end external to said chamber and a discharge end within said chamber adapted to circulate wastewater in a treatment system external said mixing zone into said top surface portion of said mixing zone bypassing said fixed channel growth media positioned in said interior of said chamber.

20. The reactor chamber according to claim 19 where said sidewall is formed from said fixed growth media.

* * * * *